April 27, 1965 P. R. FECHHEIMER 3,180,375
VOLUMETRIC FILLING MACHINE
Filed Jan. 27, 1961 2 Sheets-Sheet 1

INVENTOR.
PAUL R. FECHHEIMER,
BY
Allen & Allen
ATTORNEYS

April 27, 1965  P. R. FECHHEIMER  3,180,375
VOLUMETRIC FILLING MACHINE
Filed Jan. 27, 1961  2 Sheets-Sheet 2
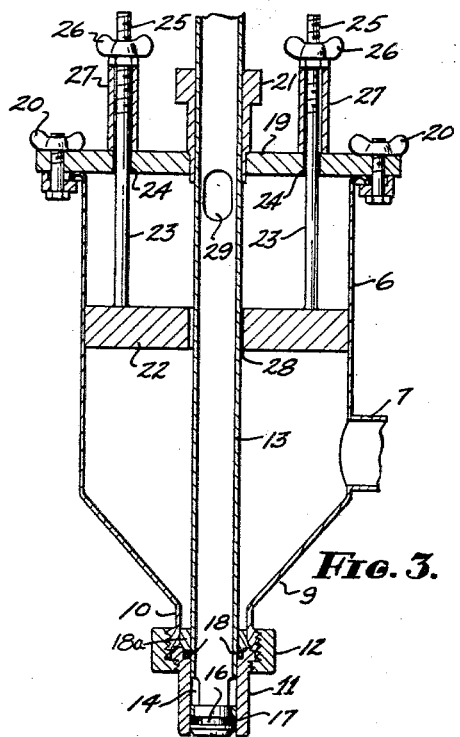
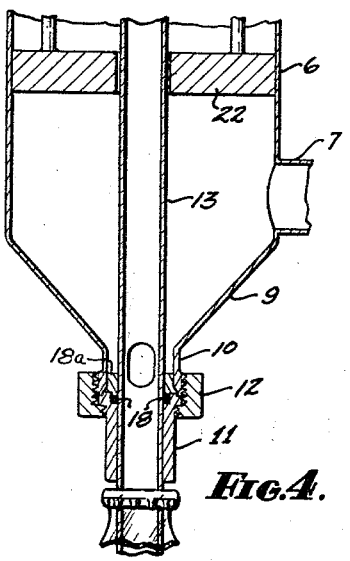
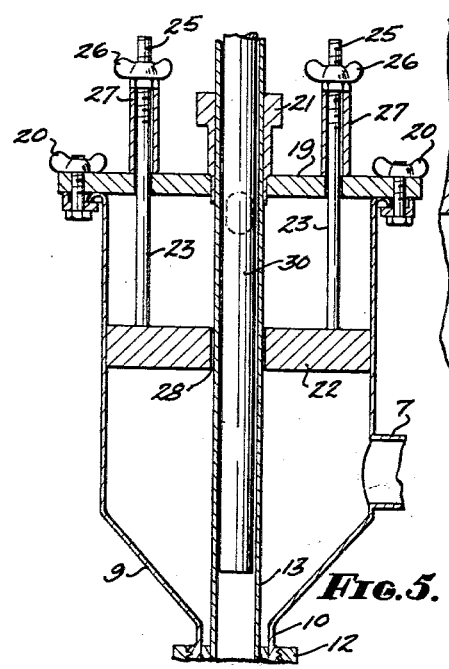
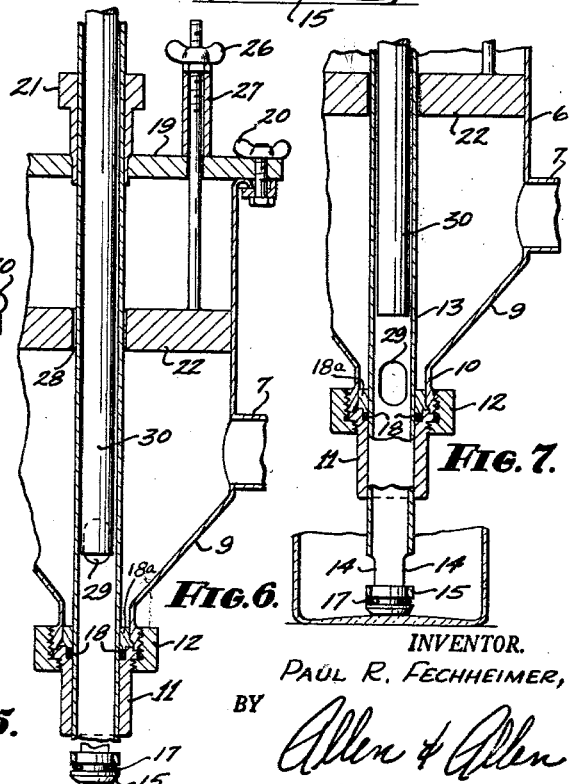
INVENTOR.
PAUL R. FECHHEIMER,
BY
ATTORNEYS

# United States Patent Office 3,180,375
Patented Apr. 27, 1965

3,180,375
VOLUMETRIC FILLING MACHINE
Paul R. Fechheimer, Cincinnati, Ohio, assignor, by mesne assignments, to Cherry-Burrell Corporation, a corporation of Delaware
Filed Jan. 27, 1961, Ser. No. 85,343
11 Claims. (Cl. 141—276)

This invention relates to machines for filling containers by introducing a filling substance through a spout or nozzle inserted into the container being filled. More particularly, the invention relates to a filling device particularly adapted to fill low viscosity and/or foamy liquids accurately on a volumetric basis, such filling taking place automatically, semi-automatically, or manually without foam or air entrainment.

The instant invention will find particular utility in the filling of milk bottles and the like wherein an accurate quantity of liquid must be introduced into each bottle as rapidly as possible without the production of foam. In such device it is highly desirable that all parts which come into contact with the milk be easily disassembled for cleaning purposes; and it is also highly desirable that the device be readily adjustable so that the user may readily change the size of the bottles being filled. Accordingly, a principal object of the instant invention is the provision of a volumetric filling device having all of the foregoing attributes.

A further obejct of the instant invention is the provision of a filling device of the character described having a measuring chamber adapted to receive a predetermined quantity of liquid from a supply chamber incorporating a liquid level control, there being a valve means between the supply chamber and measuring chamber which coacts with a retractable filling tube in the measuring chamber to introduce a predetermined quantity of filling material into a container to be filled.

Still a further object of the invention is the provision of a measuring chamber incorporating a retractable filling tube, the filling tube also acting as a valve to prevent out-flow from the measuring chamber until the tube has entered the container to be filled.

Still a further object of the invention is the provision of a measuring chamber having a retractable filling tube the inlet and out-flow openings of which are arranged to minimize foam and air entrainment in the container being filled.

Yet a further object of the instant invention is the provision of a measuring chamber having a retractable tube the inlet opening of which is so located that, when the tube is in its extreme down position, complete drainage of the measuring chamber is assured, the measuring chamber being provided with a funnel-shaped bottom which coacts with the inlet opening in the tube.

The foregoing together with other objects of the instant invention which will appear hereinafter or which will be apparent to the skilled worker in the art upon reading these specifications, I accomplish by that construction and arrangement of parts of which I shall now describe certain exemplary embodiments.

Reference is now made to the accompanying drawings wherein:

FIGURE 3 is an enlarged vertical sectional view of the measuring chamber and retractable filling tube in accordance with the instant invention.

FIGURE 4 is a fragmentary vertical sectional view similar to FIGURE 3 but illustrating the filling tube in its extreme lowermost position.

FIGURES 5, 6 and 7 are fragmentary vertical sectional views similar to FIGURE 4 but illustrating a modified form of filling tube operation.

Figure 1:
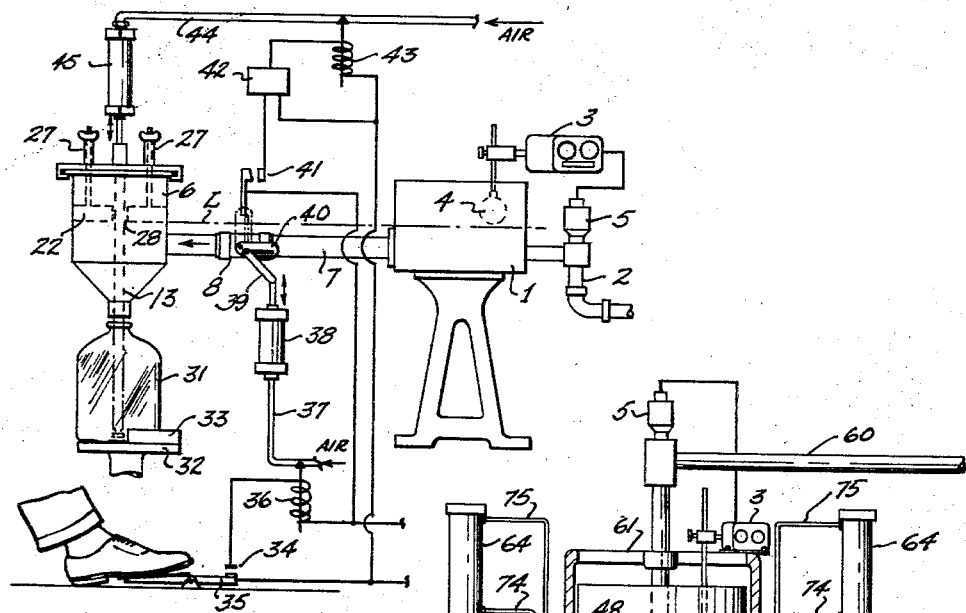
FIGURE 1 is a diagrammatic representation of a semi-automatic filling machine employing the principles of this invention.

Referring first to FIGURE 1, I have therein illustrated a semi-automatic filling machine incorporating the principles of the invention, the device being of the character which might be employed by a small dairyman or similar operator whose product volume does not justify the use of fully automatic equipment. As seen therein, a supply tank 1 is provided to which product is delivered through a conduit 2 which may be connected to any suitable source of supply (not shown). A predetermined liquid level is maintained in the supply tank 1 by means of the level control device 3 which acts, when the ball float 4 rises, to energize the throttling valve 5 which shuts off product flow into the tank 1 until such time as the liquid therein falls below the predetermined level.

A measuring chamber 6 is connected to the supply tank 1 by means of a conduit 7 provided with a control valve 8 for regulating the flow of product between the supply tank and the measuring chamber.

As seen in FIGURE 3, the measuring chamber preferably comprises a cylindrical container having a funnel-shaped lower portion 9 terminating at its lower extremity in a neck 10 to which a sleeve bearing 11 is mounted by means of a collar or ring 12. The bearing 11 is of a size to slidably receive a filling tube 13 which extends upwardly through the measuring chamber 6, the filling tube terminating at its lower end in one or more outlet openings 14 which, when the filling tube is in its uppermost or retracted position, lie within the confines of the bearing sleeve 11. The filling tube is closed at its lower end by means of a plug 15 having an annular recess 16 therein which receives an O ring 17 arranged to make sealing contact with the inner wall surface of the bearing 11 when the filling tube is in the retracted position. Preferably, the bearing sleeve 11 also mounts an O ring 18 which coacts with a plug member 18a to prevent leakage of filling material from the measuring chamber.

At its upper end the measuring chamber 6 is provided with a cover or bracket 19 which may be conveniently secured to the measuring chamber by means of wing nuts 20, the bracket member 19 mounting a centrally disposed bearing member 21 in which the filling tube is slidably journaled. The bracket 19 also serves as a convenient medium for supporting a displacement member 22 within the chamber 6, the displacement member mounting a plurality of rods 23 projecting upwardly through openings 24 in the bracket 19 and terminating at their free ends in threaded portions 25 which receive wing nuts 26. The elevation of the displacement member 22 is established by the tubular spacers 27 which surround the rods 23 and extend between the bracket 19 and the wing nuts 26. The displacement member 22 is of a size to be just nicely received within the measuring chamber 6 and it is provided with a centrally disposed opening 28 just slightly larger than the cross-sectional dimensions of the filling tube 13.

The function of the displacement member 22 can be best understood by again referring to FIGURE 1 wherein it will be seen that the displacement member is so located as to lie in the plane L, which is the normal liquid level of the filling material in the supply tank 1 and also in the measuring chamber 6 when the control valve 8 is opened and the product can flow through conduit 7. Thus, a slight fluctuation in level in the supply tank 1 represents, in volume in the measuring chamber 6, only the area between the wall surface of the opening 28 in the displacement member and the external surface of the filling tube multiplied by the linear fluctuation of the liquid level in supply tank 1. It should now be apparent that by maintaining the liquid level constant in the supply tank 1, a uniform quantity of liquid will be introduced into the measuring chamber 6 as the liquid flowing through conduit 7 seeks its own level; and any fluctuation in the level in supply tank 1 will be compensated for by the displacement member 22 thereby affording highly accurate measurement of each increment of product introduced into the measuring chamber. By adjustment of the wing nuts 26, fine adjustment of the quantity of product in the measuring chamber can be obtained.

It should be readily apparent that major adjustment of the quantity of liquid introduced into the measuring chamber may be made by altering the position of ball float 4, with a corresponding change in position of the displacement member 22, the spacers 27 being provided in varying length so as to establish standardized fill heights, i.e. quarts, half-gallons, etc. In this connection, it may be observed that the liquid level contor device 3 is a commercially available unit which is responsive to the buoyancy of the float and capable of maintaining a level with a plus or minus of about $\frac{1}{16}$ inch.

Referring again to FIGURE 3, it will be noted that the filling tube 13 has an inlet opening 29 therein which, in the uppermost or retracted position of the filling tube, lies adjacent the upper end of the measuring chamber and hence well above the liquid level. Consequently, the filling tube must be moved downwardly until the opening 29 becomes submerged in the liquid in the measuring chamber before the liquid may be discharged through the filling tube. Such downward movement of the filling tube not only acts to free the outlet openings 14 from the surrounding wall surfaces of the bearing sleeve 11 but in addition it permits the filling tube to enter the container being filled, so that initial flow through the filling tube will begin only after the outlet openings are well within the container. Preferably the downward movement of the filling tube will be rapid so that the outlet openings 14 will be quickly submerged so as to prevent further air entrainment or foaming. Alternatively, the downward movement of the filling tube may be arrested immediately after the inlet opening 29 has entered the liquid in the measuring chamber so that the initial flow rate will be relatively slow; whereupon, after a timed delay, the filling tube will move rapidly downwardly to its lowermost position and the outlet openings 14 submerged in the initial liquid which has flowed into the container gently.

Still another way of regulating the flow of liquid from the measuring chamber into the container being filled is illustrated in FIGURES 5, 6 and 7 wherein a stationary plug 30 is fitted within the filling tube 13, the plug being fixedly mounted from above so that the filling tube may move downwardly relative to the plug. The plug preferably extends downwardly through the measuring chamber but terminates short of the neck 10 at substantially the point illustrated in FIGURE 5. With this arrangement, the filling tube may be moved downwardly until it reaches a position just short of its extreme down position, the parts assuming the position illustrated in FIGURE 6 wherein only a portion of the inlet opening 29 will be exposed beneath the plug 30 for initial limited flow through the filling tube. After a short timed delay, the filling tube moves to its extreme lowermost position, thereby giving full opening to the flow of product through inlet opening 29, the parts thereby assuming the position illustrated in FIGURE 7. This arrangement has the advantage of positioning the outlet openings 14 near the bottom of the container before product flow begins, thereby further minimizing air entrainment or foaming.

As has already been indicated, the basic components which have now been described may be utilized in a manual, semi-automatic, or wholly automatic machine. A representative semi-automatic machine is illustrated in FIGURE 1 wherein a bottle or container 31 which is to be filled is placed on a platform 32 underlying the measuring chamber, the bottle being aligned by means of a guide 33, whereupon the operator may actuate suitable switch means 34, which may be controlled by the foot treadle 35, to energize solenoid valve 36 and thereby open the conduit 37 to the flow of compressed air from a suitable source of supply. The opening of valve 36 acts to energize spring loaded cylinder 38 and through linkage 39 serves to close the valve 8 in conduit 7, thereby divorcing the measuring chamber from the supply tank. In the embodiment illustrated the valve 8 has an arm 40 which, when moved to the closed position (shown in dotted lines) closes switch 41 to a time delay relay 42 which acts to energize the solenoid valve 43, thereby opening conduit 44 to the flow of compressed air which actuates spring biased cylinder 45 to move the filling tube 13 downwardly into the container. As the inlet opening 29 in the filling tube passes below the liquid level in the measuring chamber, product flow through the filling tube will begin. In the embodiment illustrated, the time delay relay is of the type which closes immediately upon being energized, the relay reopening after a predetermined time interval and remaining opened until the relay is de-energized and subsequently re-energized. Thus the filling tube 13 will be caused to enter a container to be filled immediately upon the closing of the valve 8, and the filling tube will be automatically retracted upon the subsequent closing of the valve 43 which, in the closed position, vents the conduit 44 to the outside air thereby permitting the spring in the cylinder 45 to return the filling stem to the retracted position. Similarly, the cylinder 38 will act to reopen valve 8 upon the reclosing of solenoid valve 36, which will occur when the operator releases foot treadle 35. If desired, a suitable time delay relay and holding circuit may be arranged to close the valve 36 in much the same manner as the valve 43, the valve 36 being synchronized so as to close upon the retraction of the filling tube. It will be understood, of course, that other forms of actuating mechanism may be employed to control the movement of valve 8 and the filling stem, and to this extent the mechanism illustrated is exemplary only.

Figure 2:
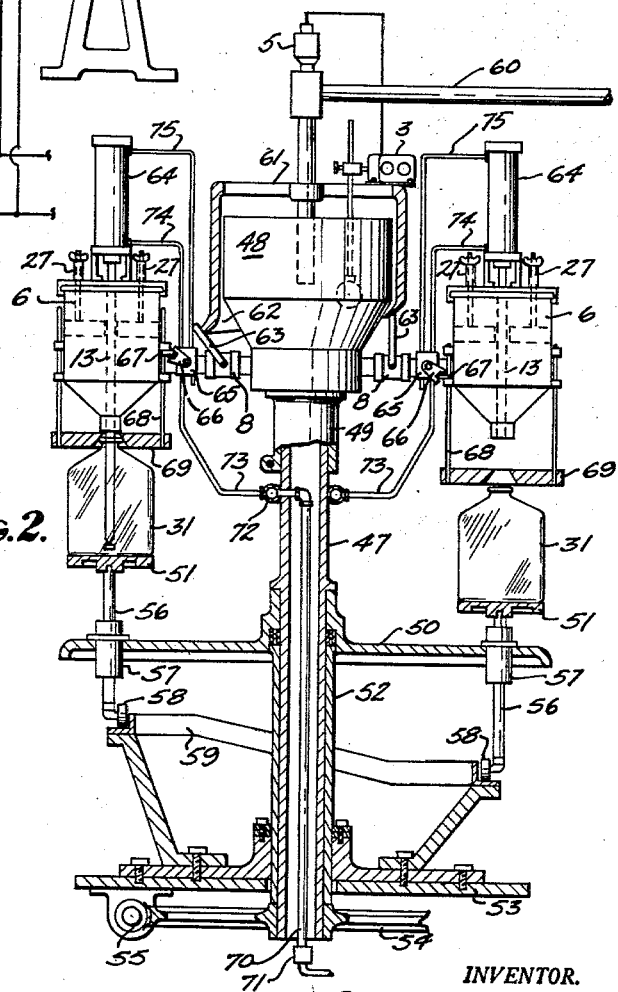
FIGURE 2 is a diagrammatic representation of the instant invention applied to a rotary filling machine.

FIGURE 2 illustrates the invention as applied to a rotary filling machine which is wholly automatic in its operation, the empty containers being delivered to the device on a suitable delivery conveyor from which the containers are deposited on the lift platforms by means of star-wheels or similar transfer mechanism, all of which are well-known to the skilled worker in the art. The rotary filling machine comprises a central rotating column 47 which bears at its upper end a supply tank 48 vertically adjustable on the column 47 by means of sleeve 49 fixedly secured to the under side of the supply tank. The column 47 is connected at its lower end to a table 50 which mounts a plurality of radially disposed lift platforms 51. The supply tank 48 has a plurality of measuring chambers 6 projecting radially outwardly therefrom in vertical alignment with the lift platforms; and it will be understood that each of the measuring chambers will be provided with a filling tube 13 of the character already described.

The column 47 is rotatably journaled in a bearing sleeve 52 secured to the fixed base 53 of the machine, the column 47 terminating at its lowermost extremity in a worm wheel 54 which meshes with a worm 55 which may be driven, directly or otherwise, by an electric motor.

The lift platforms 51 are mounted on vertically disposed rods 56 each of which is journaled in a fitting 57 in the table 50, the rods each carrying a cam follower 58 at its lower end which engages the surface of a cam 59 fixed to the base 53 of the machine. As the table and column rotate with respect to the base, the platforms 51 and the containers on them are moved from the down position as shown at the right-hand side of FIGURE 2 to up position as shown at the left-hand side of that figure.

Product is introduced into the rotating supply tank 48 by means of conduit 60 which will be provided with a throttling valve 5 similar to the valve 5 of FIGURE 1 operatively connected to the level control device 3 which may be conveniently mounted on stationary bracket 61 which supports a cam track 62 arranged to actuate the arms 63 of the control valves 8. In this embodiment the control valves 8 will be spring biased to either the closed or opened position, and the cam track 62 will be oriented to move the arms 63 against the bias of the valve springs during a portion of the rotative cycle of the device.

In the disclosed embodiment, the filling tubes 13 are raised and lowered by means of double action air cylinders 64 each of which is controlled by a four-way valve 65 having a control arm 66 arranged to be actuated by dog 67 carried on vertically movable rod 68 forming a part of centering bell 69.

Compressed air for actuating the cylinders 64 may be conveniently brought up the center column 47 by means of a conduit 70 having a rotary joint 71 so that the conduit will rotate with the column, the conduit terminating at its upper end in a circular manifold 72 having a radial conduit 73 extending outwardly therefrom to each of the valves 65. When the centering bell is in its lowermost position, as shown on the right-hand side of FIGURE 2, the control arm 66 will be in the down position and conduit 73 will be connected, through the valve, to conduit 74 which enters the lower end of cylinder 64 and hence moves the filling tube 13 to the uppermost or retracted position. At the same time, the conduit 75 at the upper end of the cylinder is vented through the valve to the outside air. When the lift platforms 51 are elevated to present the containers for filling, the centering bells will be raised and the dogs 67 will move the control arms 66 to the up position, which acts to reverse the connections so that air under pressure will be introduced into the upper end of the cylinders through conduits 75 and the conduits 74 will be vented to the outside air. The filling tubes are thus caused to enter the elevated containers and discharge product from the measuring chambers. Upon the completion of fill, the cam track 59 will return the lift platforms and the containers thereon to their lowermost position and in so doing, the centering bells, which may be spring biased, will return the control arms to the down position and hence reverse the connections of the conduits 74 and 75 so as to effect retraction of the filling tubes. With this arrangement, the centering bells also serve as a no container-no fill device.

It will be readily understood that various modifications may be made in the rotary filling machine just described without departing from its spirit and purpose; and the skilled worker in the art will appreciate that various combinations of mechanically and electrically actuated means may be employed to effect movement of the lift platform, the control valves 8 and the filling tubes. Having, however described my invention in certain exemplary embodiments what I desire to secure and protect by Letters Patent is:

1. A volumetric filling machine comprising a supply tank, means for delivering product to said supply tank, means for maintaining a predetermined level of product in said supply tank, a measuring chamber laterally disposed with respect to said supply tank, a conduit connecting said measuring chamber to said supply tank at points below the predetermined product level, a control valve in said conduit for opening and closing said conduit to the flow of product therethrough, a retractable filling tube in said measuring chamber, said filling tube being movable from a retracted to an extended position, said filling tube having an outlet opening at the lowermost end thereof and an inlet opening spaced upwardly thereof and lying within the confines of said measuring chamber, said filling tube acting as a discharge valve for said measuring chamber, said outlet opening being positioned so as to lie above the product level in said measuring chamber when said filling tube is in the retracted position, said inlet opening lying adjacent the bottom of said measuring chamber when said filling tube is in the extended position.

2. The device claimed in claim 1 including means for presenting a container to be filled to said measuring chamber in vertical alignment with said filling tube, means response to the presentation of such container for moving said control valve from open to close position, means responsive to the movement of said control valve to closed position for moving said filling tube from the retracted to the extended position, and means operative upon the discharge of product from said measuring chamber to move said filling tube to the retracted position and to open said control valve.

3. The device claimed in claim 2 including means in association with said filling tube for maintaining said inlet opening in essentially closed position until said filling tube nears its fully extended position.

4. The device claimed in claim 3 wherein said last named means comprises an elongated plug lying within the confines of said filling tube and acting to close the inlet opening in said filling tube when in contact therewith, said plug extending downwardly within said filling tube with its lowermost free end spaced upwardly from the bottom of said measuring chamber by a distance such that said inlet opening will be fully uncovered when said filling tube is in its fully extended position, said plug being fixedly secured and said filling tube being movable relative to said plug.

5. The device claimed in claim 4 wherein said filling tube has an intermediate position of use in which said inlet opening is partially uncovered by said plug, wherein said filling tube moving means includes means operative to rapidly move said filling tube to said intermediate position and, after a short time interval, to move said filling tube from the intermediate to the fully extended position.

6. In a volumetric filling machine, a supply tank, means for delivering product to said supply tank, means for maintaining a predetermined level of product in said supply tank, a measuring chamber laterally disposed with respect to said supply tank, a conduit connecting said measuring chamber and said supply tank, whereby product may flow into said measuring chamber from said supply tank to establish in said measuring chamber a level of fill corresponding to the product level in said supply tank, a valve in said conduit for closing said measuring chamber to the flow of product from said supply tank, a retractable filling tube in said measuring chamber movable from a retracted position in which said tube is closed to the flow of product therethrough to an extended position in which said tube acts to discharge the contents of said measuring chamber into a container presented thereto, and an adjustable displacement member in said measuring chamber positioned at substantially the same level as the predetermined level of product in said supply tank, said displacement member having an opening therein of a diameter slightly larger than the outside diameter of said filling tube, said displacement member being otherwise of imperforate character and of a size to be snugly received within said measuring chamber.

7. In a volumetric filling machine, a supply tank, means for delivering product to said supply tank, means for maintaining a predetermined level of product in said supply tank, a measuring chamber laterally disposed with respect to said supply tank and having a funnel-shaped bottom terminating in an annular neck portion, a conduit connecting said measuring chamber and said supply tank whereby product may flow into said measuring chamber from said supply tank to establish in said measuring chamber a level of fill corresponding to the product level in said supply tank, a valve in said conduit for divorcing said measuring chamber from said supply tank, a retractable filling tube in and extending through said measuring chamber and having an inlet opening therein oriented to lie above the product level in said measuring chamber when said filling tube is in a retracted position, said inlet opening being submersible in the product in said measuring chamber upon downward movement of said filling tube and positioned adjacent the lowermost portion of said funnel-shaped bottom when said filling tube is in the fully extended position, said filling tube also having an outlet opening in a wall surface thereof adjacent the lowermost end of said tube, the bottom of said tube being plugged, the annular neck portion of the measuring chamber surrounding and closing the outlet opening when said filling tube is in the retracted position, and an adjustable displacement member mounted in said measuring chamber, said displacement member having an opening therein of a diameter slightly larger than the outside diameter of said filling tube, said displacement member being otherwise of imperforate character and of a size to be snugly received within said measuring chamber.

8. The device claimed in claim 7 wherein a cover overlies and closes the top of said measuring chamber, and said displacement member is vertically adjustable by means of threaded rods projecting upwardly from said displacement member and secured to said cover.

9. In a volumetric filling machine, a supply tank, means for delivering product to said supply tank, means for maintaining a predetermined level of product in said supply tank, a measuring chamber laterally disposed with respect to said supply tank, a conduit interconnecting said measuring chamber and said supply tank at points below the predetermined level in said supply tank so that product can flow by gravity into said measuring chamber from said supply tank to establish in said measuring chamber a level of product corresponding to the level in said supply tank, a valve in said conduit for opening and closing the flow of product from said supply tank to said measuring chamber, means for controllably discharging a measured amount of liquid product from said measuring chamber into a container presented thereto, and a vertically adjustable displacement member in said measuring chamber, said displacement member being relatively thick and having an opening therein relatively small in size compared to the diameter of said measuring chamber, said displacement member being otherwise of imperforate character and of a size to be snugly received within said measuring chamber at a position substantially at the same level as the predetermined level of product in said supply tank.

10. In a volumetric filling machine, a supply tank, means for delivering product to said supply tank, means for maintaining a predetermined level of product in said supply tank, a measuring chamber laterally disposed with respect to said supply tank, said measuring chamber having a funnel-shaped bottom, a conduit connecting said measuring chamber and said supply tank, whereby product may flow into said measuring chamber from said supply tank to establish in said measuring chamber a level of fill corresponding to the product level in said supply tank, a valve in said conduit for divorcing said measuring chamber from said supply tank, a retractable filling tube extending through said measuring chamber and having an inlet opening therein oriented to lie above the product level in said measuring chamber when said filling tube is in the upper retracted position and to be submersible in the product upon downward movement thereof to an extended position, said inlet opening being so located that when said filling tube is in the fully extended position said inlet opening will lie adjacent the lowermost portion of said funnel-shaped bottom to assure complete drainage of product from said measuring chamber.

11. The device of claim 10 wherein said filling tube has an outlet opening and a wall surface thereof adjacent the lowermost end of said tube, the bottom of said tube being plugged, wherein said funnel-shaped bottom of the measuring chamber terminates in an annular neck portion of a size to surround and close the outlet opening when said filling tube is in the retracted position.

References Cited by the Examiner

UNITED STATES PATENTS

| | | | |
|---|---|---|---|
| 874,639 | 12/07 | Taylor | 141—146 XR |
| 1,010,692 | 12/11 | Schneider | 141—146 XR |
| 1,326,253 | 12/19 | Cordley et al. | 222—440 XR |
| 1,483,861 | 2/24 | Heulings | 141—146 XR |
| 1,711,361 | 4/29 | Miller | 141—140 XR |
| 1,850,200 | 3/32 | Cereghino | 141—146 XR |
| 1,992,329 | 2/35 | Schmidt | 222—168.5 XR |
| 2,144,628 | 1/39 | Hothersall | 222—263 XR |
| 2,413,194 | 6/46 | Russell | 222—440 XR |
| 2,839,094 | 6/58 | Reno | 141—140 XR |
| 3,040,787 | 6/62 | Knoll | 141—263 XR |

LAVERNE D. GEIGER, *Primary Examiner.*

RAPHAEL M. LUPO, *Examiner.*